(12) United States Patent
Egger et al.

(10) Patent No.: US 8,307,718 B2
(45) Date of Patent: Nov. 13, 2012

(54) METHOD FOR MEASURING A DISTANCE FROM A BASE SURFACE TO A TAPERING SURFACE OF A BODY

(75) Inventors: Hans Egger, Thörishaus (CH); Werner Tschannen, Frauenkappelen (CH)

(73) Assignee: Marposs Societa' per Azioni, Bentivoglio (BO) (IT)

( * ) Notice: Subject to any disclaimer, the term of this patent is extended or adjusted under 35 U.S.C. 154(b) by 153 days.

(21) Appl. No.: 12/996,757

(22) PCT Filed: Jun. 8, 2009

(86) PCT No.: PCT/EP2009/057035
§ 371 (c)(1),
(2), (4) Date: Dec. 7, 2010

(87) PCT Pub. No.: WO2009/150126
PCT Pub. Date: Dec. 17, 2009

(65) Prior Publication Data
US 2011/0099827 A1      May 5, 2011

(30) Foreign Application Priority Data
Jun. 9, 2008    (EP) .................................... 08157854

(51) Int. Cl.
*G01F 1/00* (2006.01)
(52) U.S. Cl. ....................................................... 73/861

(58) Field of Classification Search ..................... 73/861; 250/559
See application file for complete search history.

(56) References Cited

U.S. PATENT DOCUMENTS

| | | | |
|---|---|---|---|
| 2004/0261550 A1* | 12/2004 | Asa | 73/865.9 |
| 2007/0101597 A1 | 5/2007 | Nappier | |
| 2008/0060431 A1* | 3/2008 | Frovik | 73/290 V |

FOREIGN PATENT DOCUMENTS

| | | |
|---|---|---|
| DE | 42 34 788 A1 | 4/1994 |
| DE | 195 34 259 A1 | 3/1997 |
| DE | 103 03 250 A1 | 8/2004 |
| JP | 57-191507 A | 11/1982 |

* cited by examiner

*Primary Examiner* — Jewel V Thompson
(74) *Attorney, Agent, or Firm* — Dickstein Shapiro LLP

(57) ABSTRACT

In a method for measuring a distance from a base area (5) to a cross section, with a predefined diameter (A), of a tapering area (1.1) of a body (1), which tapering area forms an elevation or depression and has a circular cross-sectional form, a measuring body (3) with a diameter (A) is arranged on the base area (5). The arrangement is effected in such a manner that a distance in the form of a gap (6, X) is formed between the cross-sectional area, with the diameter (A), of the body (1) and the measuring body (3). A fluid medium is pressed through the gap (6, X) and the pressure and/or the flow rate of the fluid medium is/are measured. The distance value is determined in an evaluation device (9) on the basis of the measured pressure and/or the flow rate.

10 Claims, 3 Drawing Sheets

METHOD FOR MEASURING A DISTANCE FROM A BASE SURFACE TO A TAPERING SURFACE OF A BODY

The present invention relates to a method for measuring a distance from a base surface to a cross section with a predetermined diameter of a tapering surface of a body, the tapering surface forming an elevation or a depression and having a circular cross-sectional shape.

The invention also relates to a measuring system for carrying out this method.

In the prior art there are known mechanical pieces whose surface has a countersink with different shapes and a specific depth. There can also be countersinks that are provided with through holes or not. Moreover, such mechanical pieces can also have an extroversive conical or spherical shape. The corresponding machined surface of this body must be very accurate; thus such bodies, whose machined surfaces are a countersink ending in a through hole, are used for example as sealing surface, as they are employed in different application areas. In order that the cone or the sphere, which is placed in the countersink, can seal with a defined distance from the base surface, an accurate machining of the surface of the countersink is needed and a corresponding control is necessary. This control consist of an accurate measurement of the depth of the countersink.

Therefore, it is particularly necessary to quickly and very accurately measure the depth parameter of the countersink that can have whatever shape. In doing so, the maintenance of the measuring device has to be negligibly small.

The measurement of defined depth dimensions in countersinks is known in the prior art and it is already applied in the metallurgical industry. Hence, for example by means of a mechanic measuring method for determining the hollow depth of, for example, a valve seat, a master standard with a defined base is placed in the countersink and the distance to a defined base surface is measured. The disadvantage is that the measurement is not accurate in contaminated surfaces. Furthermore, the countersink and/or the master standard can be damaged if the master standard is inserted with too much strength. Moreover, by means of this measuring method form errors featured by the countersinks and the master standards are not considered.

The object of the present invention is to provide a new method for measuring a distance from a base surface to a cross section of a tapering surface of a body, the tapering surface forming an elevation or a depression and having a circular cross sectional shape, wherein the cross section has a predetermined diameter. This new method enables to eliminate the disadvantages of the above described prior art. In particular, the new method must enable to quickly and very accurately perform the measurement of the tapering surface, and to keep the maintenance of the measuring device negligibly small.

According to the invention the object is achieved by arranging a measuring body with a diameter on the base surface in such a way that a distance is created in the form of a gap between the cross sectional surface with the diameter of the body and the measuring body; by pressing a fluid medium through the gap and by measuring the pressure and/or the flow rate of the fluid medium; and by determining the distance value in an evaluation unit on the basis of the measured pressure and/or flow rate.

A further object of the invention is to provide a measuring system for carrying out this method. According to the invention this is achieved by the fact that this measuring system includes a measuring unit for measuring the pressure and/or the flow rate of the gas and/or the liquid conveyed towards a gap between a hollow of a base and a measuring body; and an evaluation unit for determining the distance value from the measured pressure and/or the measured flow rate.

In particular, thanks to the invention these objects are achieved by arranging a measuring body with respect to a base surface in such a way that between the measuring body and the defined cross sectional surface there is a defined distance in the form of a gap. By means of a device a gaseous and/or fluid medium is conveyed with a defined pressure through the annular gap. The pressure and/or the flow rate, which are measured in this way, is/are proportional to the annular gap between the measuring body and the hollow. The distance value can be determined in an evaluation unit on the basis of this measured pressure and/or flow rate. In this way it can be rapidly verified whether a flow rate and/or a distance value of the tapering surface lies/lie inside a range of tolerance, at the margin of a range of tolerance, or outside a range of tolerance.

In particular, such a method has the advantage of enabling a quick and very accurate measurement of the tapering surface. Moreover, using this type of measurement avoids damages to the tapering surface.

Unlike a mechanical measuring method, it is possible to take into account possible functions of the tapering surface that can be important for the usage, such as those occurring in the operation of a completely assembled unit. Moreover, the measuring method can be employed in a normal production environment wherein an increase in production due to reduced cycle times is achieved. With this type of measuring method a higher automation level and a high quality of the measurement are ensured. Furthermore, the pieces checked with this measuring method have not to be previously subject to cleaning and/or drying.

Preferably, the fluid medium is pressed by means of a pressure measuring unit through the gap, the pressure of this fluid medium is measured, and the distance value is determined in the evaluation unit. This can be very easily achieved.

However, the flow rate of the fluid medium pressed through the gap can also be measured by means of a flow measuring unit, and the distance value can be determined in the evaluation unit.

Preferably, air is conveyed through the gap by means of the pressure measuring unit. In particular, such a method has the advantage of enabling the measuring method to be carried out under atmospheric conditions.

However, the distance value determined by this method can also be compared to a minimum and a maximum distance value defined by corresponding master standards, wherein it is immediate to identify whether the distance value lies inside the defined range of tolerance.

In another alternative embodiment the distance value and/or the flow rate of a non-linear pneumatic measurement are corrected in a mapping process and are deposited in tabular form in the evaluation electronics. In particular, the advantage of such a method is that with the mapping process the evaluation of the distance expressed in micron can be calibrated by means of the pressure variation or the flow rate.

Hereinafter the method according to the invention is disclosed in more detail by way of example with reference to the alternative embodiments illustrated in the enclosed drawings, wherein.

Figure 1:
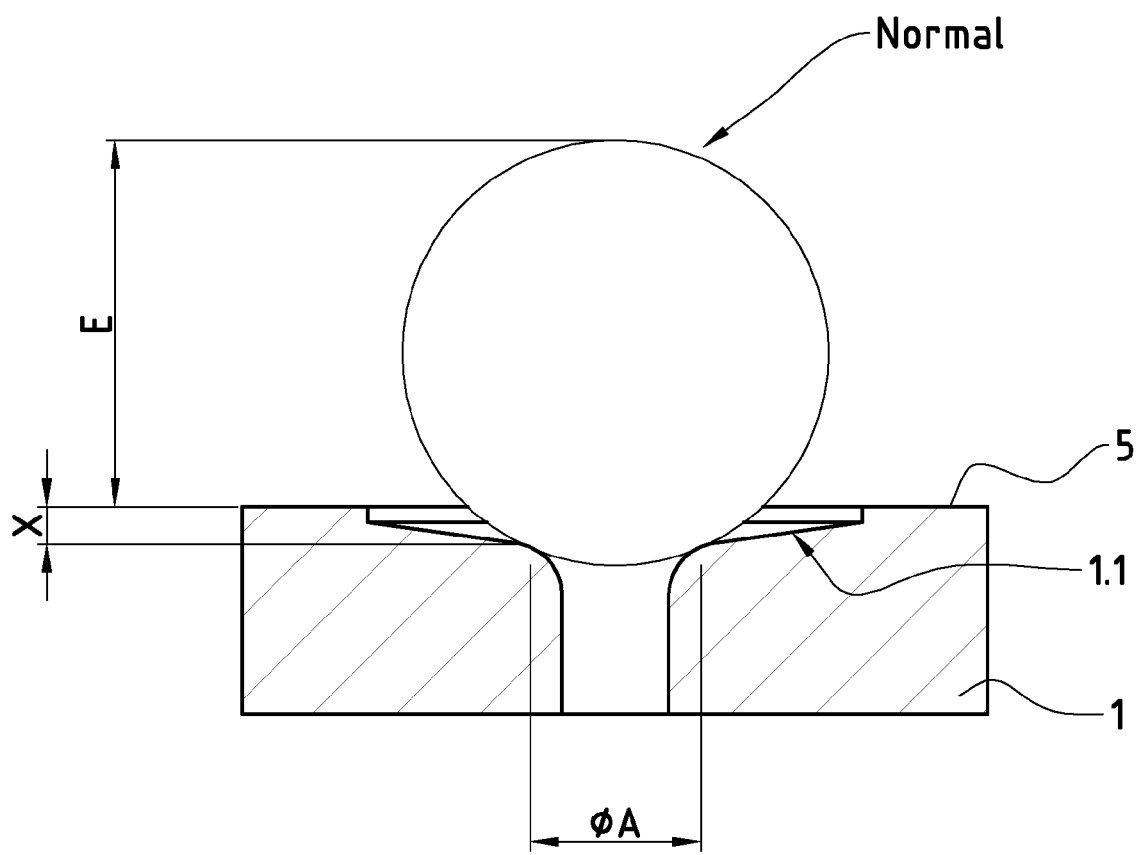
FIG. 1 shows an arrangement for a measuring method according to the prior art.

In FIG. 1 the reference number 1 refers to a body and the reference number 1.1 refers to a tapering surface, in the form of a countersink. This kind of counstersinks is applied, for example, in the combustion engine sector, in particular for valve seats, in fluidic devices, in the medical field or other devices. For ensuring the efficiency of such countersinks with or without opening, the parameters of the countersink, in particular, must be very precisely established. For measuring such parameters, the measuring method illustrated in FIG. 1 is known in the prior art. In this measuring method a master standard is placed in the hollow. According to the measuring method such a reference standard can be substantially, for example, a sphere, as shown in simplified form in FIG. 1, or it can have any other shape. After the master standard is arranged in the countersink 1.1, a length E of the master standard protruding from a base surface or support 5 can be determined. On the basis of the measurement of the length E it is possible to verify whether a length X, that marks for example the depth of the countersink, lies inside a defined tolerance range. It is obvious that, for example, pollutants on the sphere and/or on the countersink provide incorrect measuring results.

Figure 2:
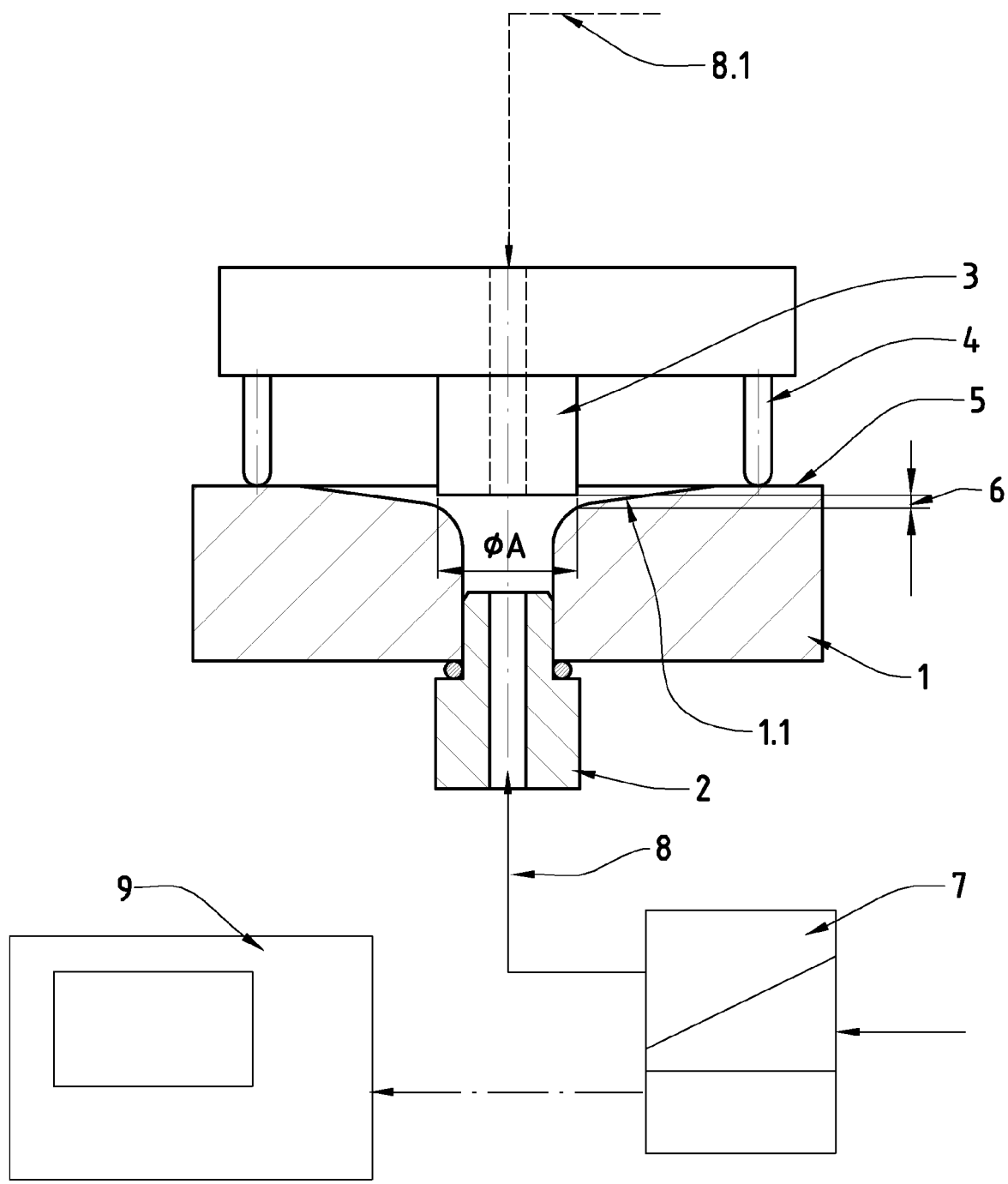
FIG. 2 shows an arrangement for carrying out a measuring method according to the invention.

In FIG. 2 there is shown a measuring system according to the invention with which the measuring method according to the invention can be carried out. The same elements are marked with the same reference numbers, such as the mentioned elements in the known embodiment according to FIG. 1. In the measuring method according to the invention shown in FIG. 2 a measuring body 3 with a diameter A is arranged with respect to the support 5 of the body 1. As shown in FIG. 2, the measuring body 3 can be arranged for example on the support 5 by means of support points 4. The person skilled in the art knows many different alternative embodiments for ensuring a relative arrangement of the measuring body 3 with respect to a support 5 of the body 1. According to the measuring method the relative arrangement can refer to any other reference/parts of the body 1 or of the countersink 1.1 instead of referring to the support 5. The measuring body 3 is arranged in such a way that in the relative arrangement with respect to anyone of the mentioned references/parts there is a gap 6 between the measuring body 3 and the countersink 1.1 having the cross section with the diameter A. The measuring body 3 can consist, for example, of a cylinder, thus the gap 6 is a circular gap. In order that a uniformly circular gap is formed, the axis of the measuring body 3 is arranged identically to the axis of the countersink.

In FIG. 2 the reference number 7 refers to a pressure measuring unit. The pressure measuring unit 7 can be arranged for feeding a conduit 8 with a gas, in particular air, and/or a fluid with a defined pressure. As shown in simplified form in FIG. 2, the gas and/or the fluid can be conveyed through the conduit 8 or, alternatively, through the conduit 8.1. In case that the conduit 8.1 is used, the workpiece holder 2, on which the body to be measured can be placed, does not have holes, that is the through countersink is sealingly closed. It is important that the gas and/or the fluid is/are discharged through the gap 6.

As shown in simplified form in FIG. 2, as an alternative, there can be a flow measuring unit in place of the pressure measuring unit 7, or there can be a combination with a pressure measuring unit and a flow measuring unit.

As shown in FIG. 2, there is an evaluation unit 9. The evaluation unit 9 is set to assign a measured pressure value or a measured flow value to a distance value and/or to a flow rate. Therefore, for example, the evaluation unit 9 can include means for showing a measured pressure value of a deviation of the countersink depth with respect to a previous arrangement by means of measurement standards. In doing so it can be used as measurement standard a basis body with a countersink having the desired geometry.

By lifting the measuring body by placing master standards under the support structure, a new, accurately defined distance is created. The pressure variation between the first and the second position of the measuring body is electronically computed and indicated in micron.

It is also possible to use, for example, three measurement standards: a first measurement standard for an upper range of tolerance, a second measurement standard for a middle range of tolerance and a third measurement standard for a lower range of tolerance.

The three measuring standards define an exact distance value. The evaluation unit 9 can thus include means for assigning a pressure measurement to an exact distance or to a range of tolerance.

In particular, commercially available devices, such as, for example, pneumo-electronic converters of the Marposs model MRT or LVDT, can be used as pressure measuring units 7.

In particular, the evaluation unit can include a microprocessor based, electronic unit with an analog to digital converter for converting an electrical signal, that complies with the pneumo-electronic converter, with a programmable processor for processing source codes, with a display for showing the computed values, and with input means for controlling or modifying the production process. Such a microprocessor based unit can further include a mapping system with which non-linear values of the pressure measurement are expressed in micron in a linear scale so that they can be checked with mechanical master standards.

Figure 3:
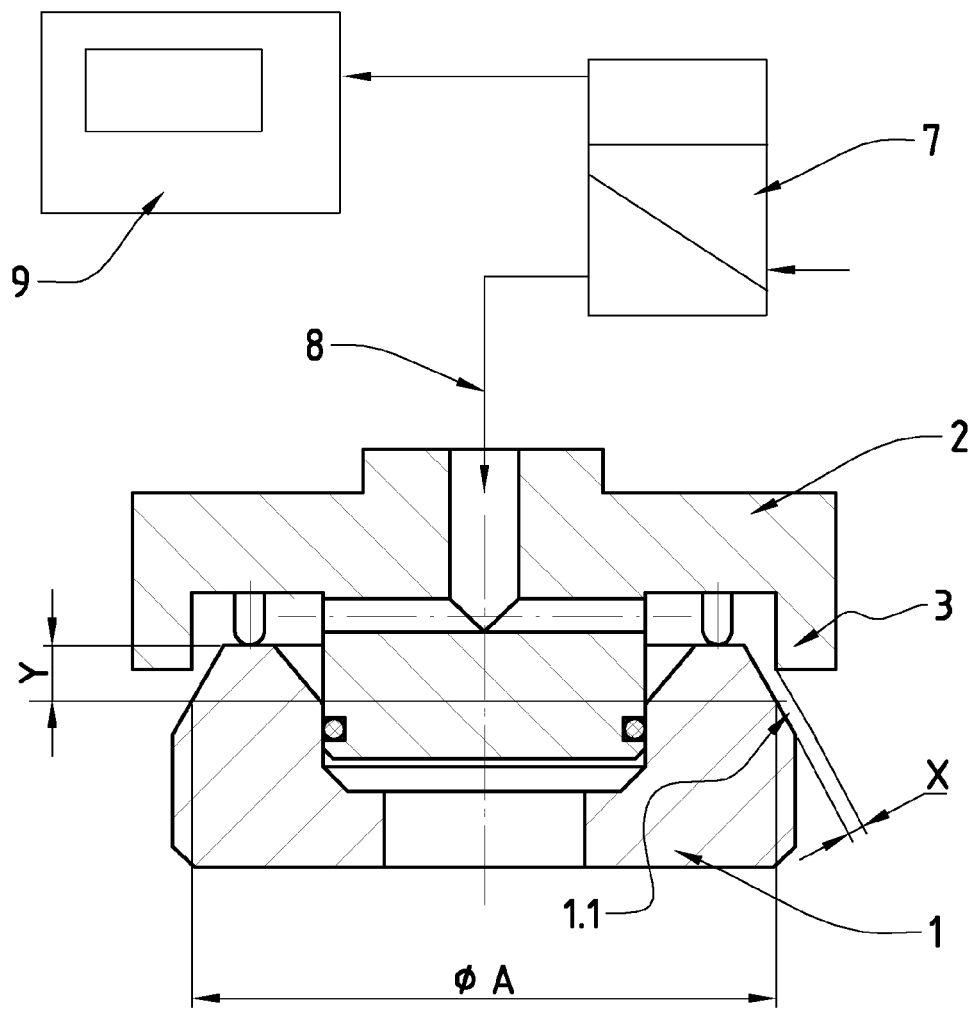
FIG. 3 shows a further arrangement for carrying out a measuring method according to the invention.

In FIG. 3 it is shown in simplified form an arrangement for carrying out the measuring method according to the invention in case of an external tapering surface, wherein the same elements are marked with the same reference numbers, such as the corresponding elements of the hereinbefore described examples of embodiment. As shown in simplified form in FIG. 3, a centering unit 2 and a measuring body 3 can consist of a body, so that there is a gap X between the measuring body 3 and a tapering surface 1.1 of the body 1, and wherein a pressure is measured by employing a pressure measuring unit 7 and by leading a gas and/or a fluid through the gap 6 accordingly. Alternatively, it is possible to perform a flow measurement instead of a pressure measurement.

The invention claimed is:

1. A method for measuring a distance from a base surface of a body to a cross section, having a predetermined diameter, of a tapering surface of the body, the tapering surface forming an elevation or a depression and having a circular cross-sectional shape, the method comprising:
    arranging a measuring body having the predetermined diameter with respect to the base surface in such a way that a gap is created between the cross sectional of the tapering surface having the predetermined diameter and the measuring body;
    pressing a fluid medium through the gap;
    measuring the pressure and/or the flow rate of the fluid medium; and
    determining, on the basis of the measured pressure and/or of the flow rate, a distance value in an evaluation unit.

2. The method according to claim 1, wherein pressing the fluid medium through the gap is by means of a pressure measuring unit, and the measuring step comprises measuring the pressure of the fluid medium.

3. The method according to claim 1, wherein the step of measuring comprises measuring the flow rate of the fluid medium pressed through the gap by means of a flow measuring unit.

4. The method according to claim 2, wherein air is conveyed through the gap by means of the pressure measuring unit.

5. The method according to claim 1, wherein the determined distance value is compared to a minimum and a maximum distance value defined by means of corresponding master standards.

6. The method according to claim 1, further comprising a mapping process wherein deviations in the non-linear pneumatic measurement are corrected and deposited in the evaluation unit.

7. The method according to claim 2, wherein the determined distance value is compared to a minimum and a maximum distance value defined by means of corresponding master standards.

8. The method according to claim 3, wherein the determined distance value is compared to a minimum and a maximum distance value defined by means of corresponding master standards.

9. The method according to claim 4, wherein the determined distance value is compared to a minimum and a maximum distance value defined by means of corresponding master standards.

10. A measuring system for measuring a distance from a base surface of a part to a cross section, having a predetermined diameter, of a tapering surface of the same part, the tapering surface forming an elevation or a depression relative to the base surface and having a circular cross-sectional shape, the system comprising:
 a measuring body which has a diameter and is adapted to be arranged with respect to the base surface in such a way that a gap is created between the cross section of the tapering surface having with the predetermined diameter and the measuring body;
 a measuring unit for measuring the pressure and/or the flow rate of a fluid conveyed through said gap; and
 an evaluation unit for determining a value of said distance to be measured on the basis of the measured pressure and/or of the measured flow rate.

* * * * *